(12) United States Patent
Maier et al.

(10) Patent No.: US 7,667,771 B2
(45) Date of Patent: Feb. 23, 2010

(54) SYSTEM FOR INTERLACED VIDEO DATA

(75) Inventors: Michael Maier, Schwenningen (DE); Detlef Teichner, Köningsfeld (DE); Pirmin Weiber, Villingen (DE); Thomas Menzl, Villingen (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 684 days.

(21) Appl. No.: 11/292,942

(22) Filed: Dec. 2, 2005

(65) Prior Publication Data

US 2006/0192891 A1    Aug. 31, 2006

(30) Foreign Application Priority Data

Dec. 2, 2004   (EP)   ................... 04028606

(51) Int. Cl.
*H04N 7/01* (2006.01)
*H04N 11/20* (2006.01)

(52) U.S. Cl. .................. 348/448; 348/458; 386/68
(58) Field of Classification Search ......... 348/441–459; 386/83
See application file for complete search history.

(56) References Cited

U.S. PATENT DOCUMENTS

| 5,864,369 | A | 1/1999 | Swan |
| 6,515,706 | B1 | 2/2003 | Thompson et al. |
| 6,661,464 | B1 * | 12/2003 | Kokkosoulis et al. ....... 348/448 |
| 6,972,801 | B1 * | 12/2005 | Ding et al. .................. 348/448 |

* cited by examiner

*Primary Examiner*—M. Lee

(57) ABSTRACT

A reproduction system reproduces interlaced video data in a deinterlaced form. The system selects a deinterlacing algorithm used to process the interlaced video data. The deinterlaced video data is sent to a display device. The reproduction system responds to a manual or automated input that selects a deinterlacing algorithm.

23 Claims, 6 Drawing Sheets

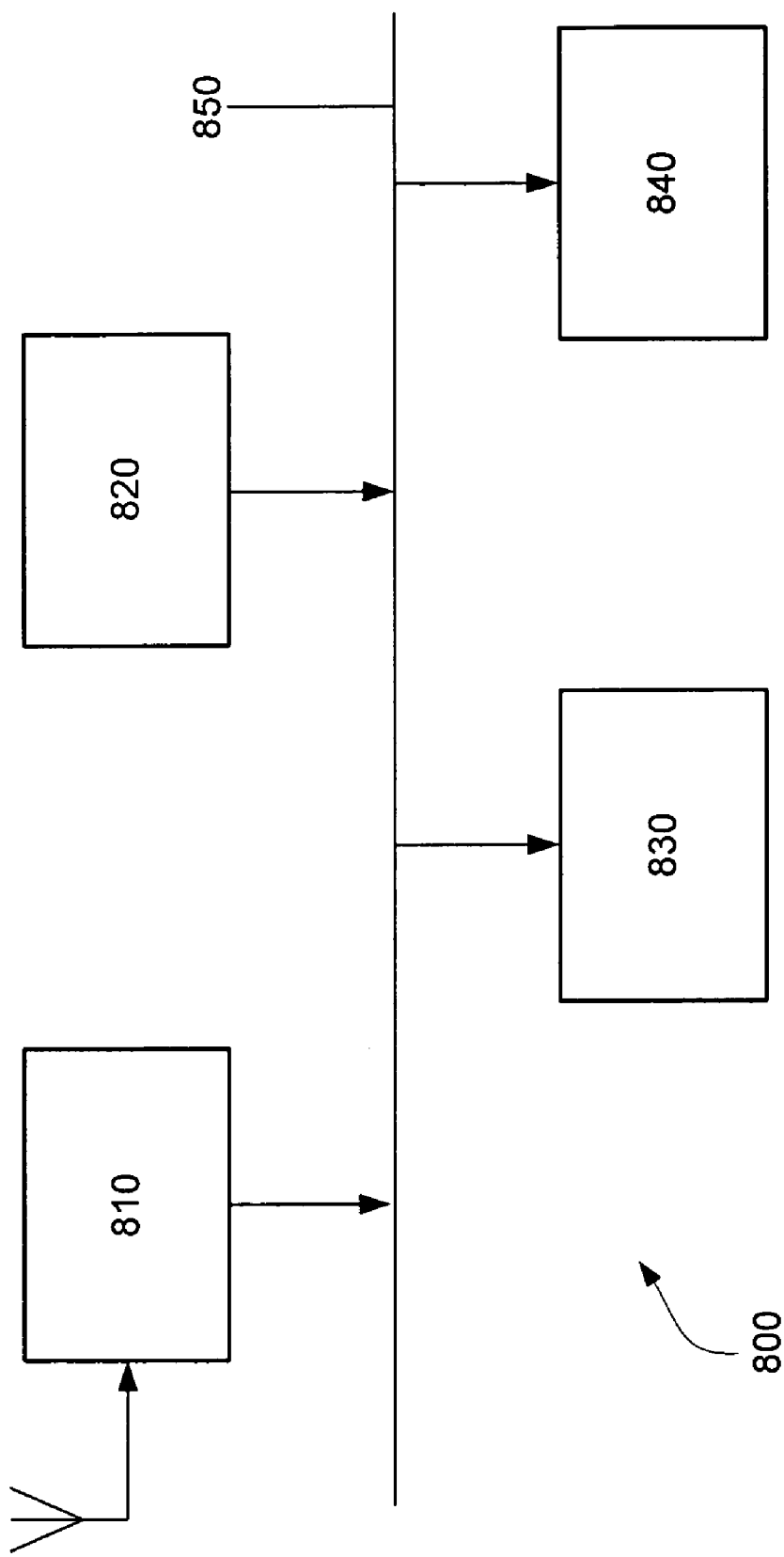

SYSTEM FOR INTERLACED VIDEO DATA

BACKGROUND OF THE INVENTION

1. Priority Claim

This application claims the benefit of priority from European Patent Application No. 04 028 606.4, filed Dec. 2, 2004, which is incorporated by reference.

2. Technical Field

The invention relates to a system that processes video data, and more particularly, to a reproduction system that processes interlaced video sequences.

3. Related Art

Digital versatile discs (DVDs) may be used to store video data. Video data may be stored on DVDs in an interlaced video sequence having many subsequent fields. With an interlacing technique, a screen displays a sequence of fields rather than a sequence of frames. One field contains odd-numbered lines only (odd field) and the next field contains only even-numbered lines (even field). The odd field and the even field are not displayed at the same time, but human eyes may perceive pairs of fields simultaneously as a full frame.

Video sequences may differ depending on a television standard. Video sequences that comply with Phase Alternation Line (PAL) television standard, which is European format, may include 50 fields per second. National Television System Committee (NTSC) video sequences may comprise 60 fields per second. Both television standards may also differ in the number of lines that make up a complete image. While the PAL standard defines each complete image to include 575 lines, a complete NTSC image include 480 lines.

Many video sequences may be recorded on DVDs in an interlaced form. When displayed, only half of the pixel information of a complete image may be provided to display each field. To improve picture quality, DVDs may output interlaced video data in a progressive form. The progressive form may allow each field to be converted into a complete frame. Progressive images may be permitted to display about 50 frames per second for PAL video sequences instead of 50 fields (60 frames/fields for NTSC video sequences). Therefore, a need exists for a system that converts interlaced video content into a progressive form.

SUMMARY

A system that reproduces video data includes a user-control panel and/or a remote control. The system detects a current reproduction operation. The reproduction system compares the detected reproduction operation to a list of operations. Each operation may select a deinterlacing algorithm. When selected, the system may process a video signal in a deinterlaced form.

Other systems, methods, features, and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 8 is a block diagram of a vehicle entertainment system linked to a communication network.

DETAILED DESCRIPTION OF THE PREFERRED EMBODIMENTS

A deinterlacing process converts interlaced video. The process converts a sequence of fields into a sequence of frames. To minimize perceived flickers and improve picture quality, interlaced video may be deinterlaced through deinterlacing techniques such as weaving and/or blending. Weaving deinterlacing ("WEAVE") may combine two consecutive fields to one frame. Blending deinterlacing such as a BOB deinterlacing may create a frame from a single field by line doubling.

Figure 1:
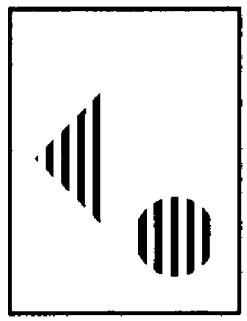
FIG. 1 illustrates fields of an interlaced video sequence.
Figure 1:
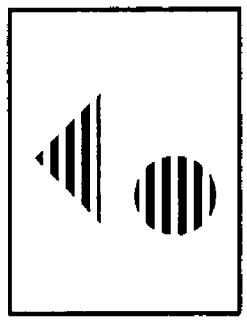
Figure 1:
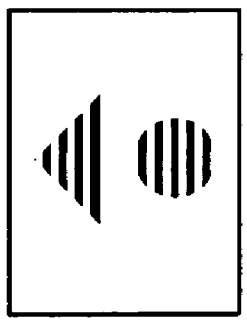
Figure 1:
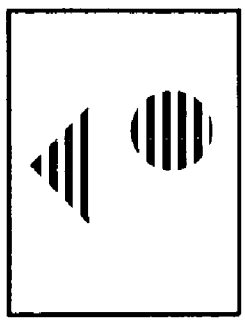

FIG. 1 illustrates an interlaced video sequence. In FIG. 1, the interlaced video sequence includes a stationary triangle and a moving circle. Each field includes half of the lines of a complete frame updated in an alternating manner. In FIG. 1, the first two sequences on the left correspond to odd and even fields of a first complete frame. The second two sequences on the right correspond to odd and even fields of a second complete frame.

Figure 2:
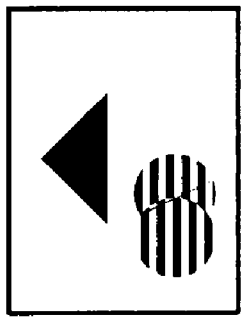
FIG. 2 illustrates de-interlaced video sequences.
Figure 2:
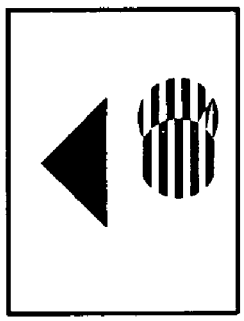

FIG. 2 illustrates visual artifacts created by a WEAVE deinterlacing. Artifacts may be present in deinterlaced video because the interlaced video has only half the information of non-interlaced video. While vertical resolution of the stationary triangle may increase by combining odd and even fields, the shape of a moving object may be created through two different motion phases of the two moving objects. The WEAVE deinterlacing may create "feathering or combining" artifacts at the edges of moving objects.

Figure 3:
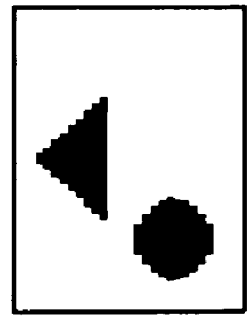
FIG. 3 illustrates second de-interlaced video sequences.
Figure 3:
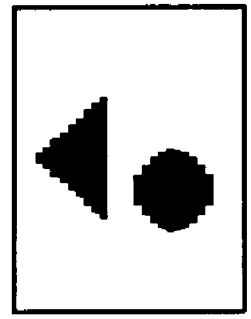
Figure 3:
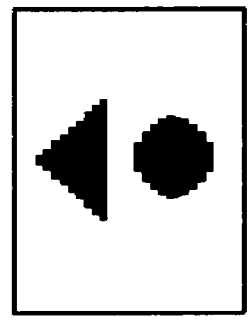
Figure 3:
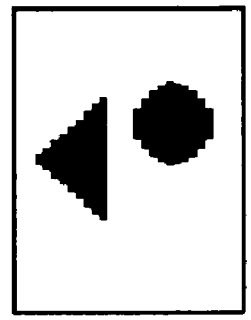

FIG. 3 illustrates a result created through BOB deinterlacing. In FIG. 3, the motion phases of the moving objects may be correctly represented. Additional image details, which are only available from the other field, may not be present in the BOB interlaced images. The BOB deinterlacing may create flickers at thin horizontal lines.

To produce the improved deinterlaced image, motion compensation may be performed for the WEAVE deinterlacing and filtering for the BOB deinterlacing. Alternatively, an adaptive switching between the WEAVE and the BOB deinterlacings may be utilized to apply a different deinterlacing technique depending on the image content. Such improved deinterlacing approaches may be performed with simplified hardware configuration.

Figure 4:
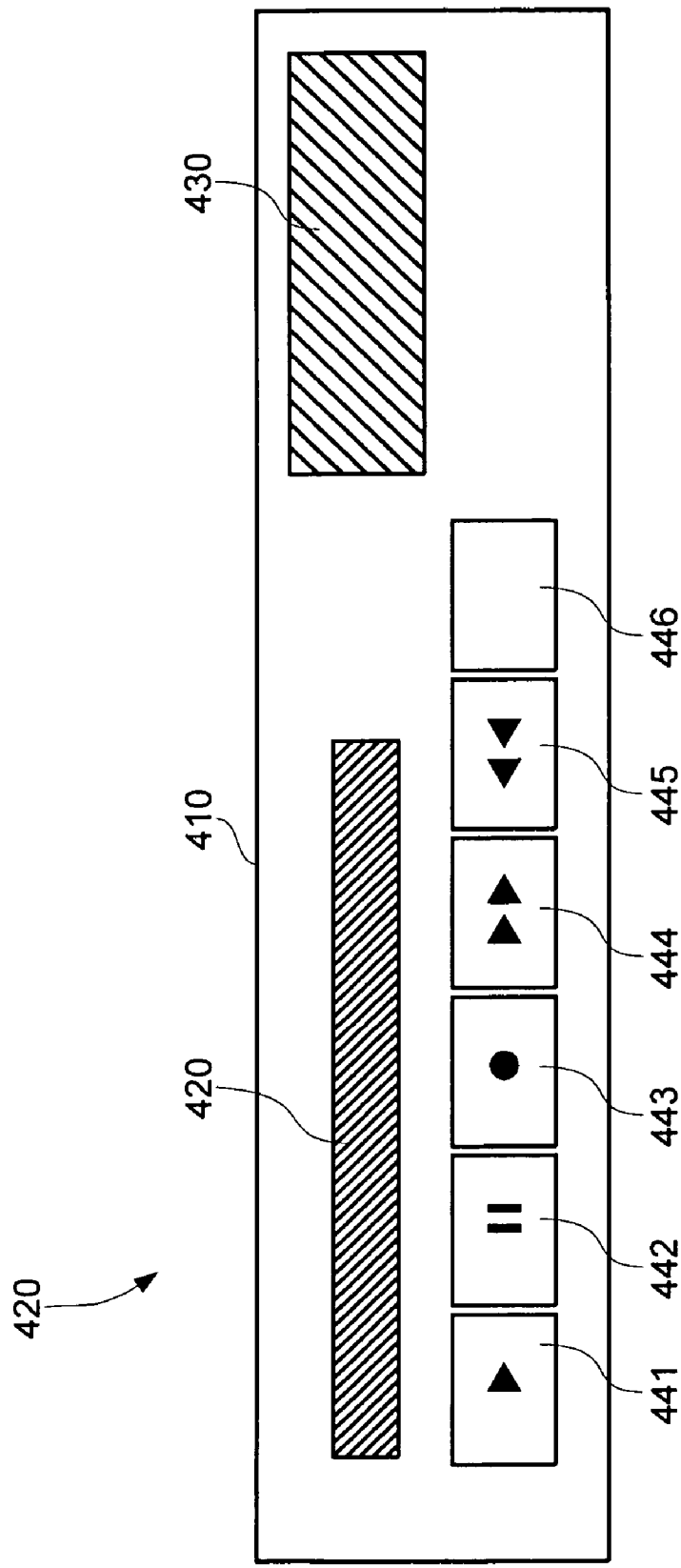
FIG. 4 illustrates a front view of a DVD player.

FIG. 4 illustrates a front view of a DVD player 400 with a number of panel controls. The DVD player 400 may reproduce interlaced video data from an optical or magnetic storage medium. The storage medium may include an optical storage medium, such as a compact disk (CD), a DVD, or a high density DVD. Additionally, the storage medium may comprise a magnetic storage medium, such as a hard disk drive, or a flash memory. Various devices for reproducing video data may also be used including compact disc players, MP3 players, Videocassette Recorder (VCR), etc.

The DVD player 400 includes a housing 410. The housing may have a moveable tray 420 for loading a disk such as a DVD. Front panel controls 441-446 may initiate a function upon user actuation. Operating information may be displayed in a display unit 430.

Operating functions of the DVD player 400 may also be actuated with a remote control. The remote control may enable additional function ability of the DVD player 400. The front panel controls 441-446 include many buttons, switches, keys, or other equivalent structures. The front panel controls 441-446 include a PLAY button 441, a PAUSE button 442, a STOP button 443, a FAST FORWARD button 444 and a REVERSE button 445. Button 446 may include other functions that may be accessed from the front panel of the DVD player 400.

Actuating the PLAY button 441 initiates reproduction of video content. Alternatively, actuation of other buttons may initiate the reproduction. Some of DVD players may begin reproduction automatically when a CD or a DVD is inserted into the tray 420. A title may be selected from a menu that describes a function such as "play movie" (or similar) to start the playback.

Actuating the PAUSE button 442 may suspend the playback. To resume the playback, the PLAY button 441, or the PAUSE button 442 may be actuated again. Upon actuation, the STOP button 443 may stop the playback. The FAST PLAY buttons 444 and 445 may actuate a fast forward play, or a fast backward play. Depending on individual implementations, different fast playback speeds are possible by pressing the FAST PLAY buttons 444 and 445 repeatedly.

Additional controls may be provided on a remote control. Such additional controls may relate to DVD navigation functions, such as a cursor pad, or navigation buttons and MENU or MAIN MENU buttons. In particular, upon actuation of the MENU button, the DVD reproduction may return to the DVD's disk menu. Use of the individual navigation buttons may depend on the navigation menu which may be specific to each disk and may vary with each title. A navigation menu offers selection of chapters and languages and viewing extra material such as trailers or documentaries. When the menu has been accessed, a user may move around the menu with a cursor pad, or the navigation buttons and select individual items.

The DVD player 400 may send de-interlaced image data to a progressive scan terminal for display on a display device. Alternatively, the DVD player 400 may be part of an entertainment system, such as a system that includes a vehicle entertainment system. In these systems, the deinterlaced video data is processed before it is shown on a display screen.

Figure 5:
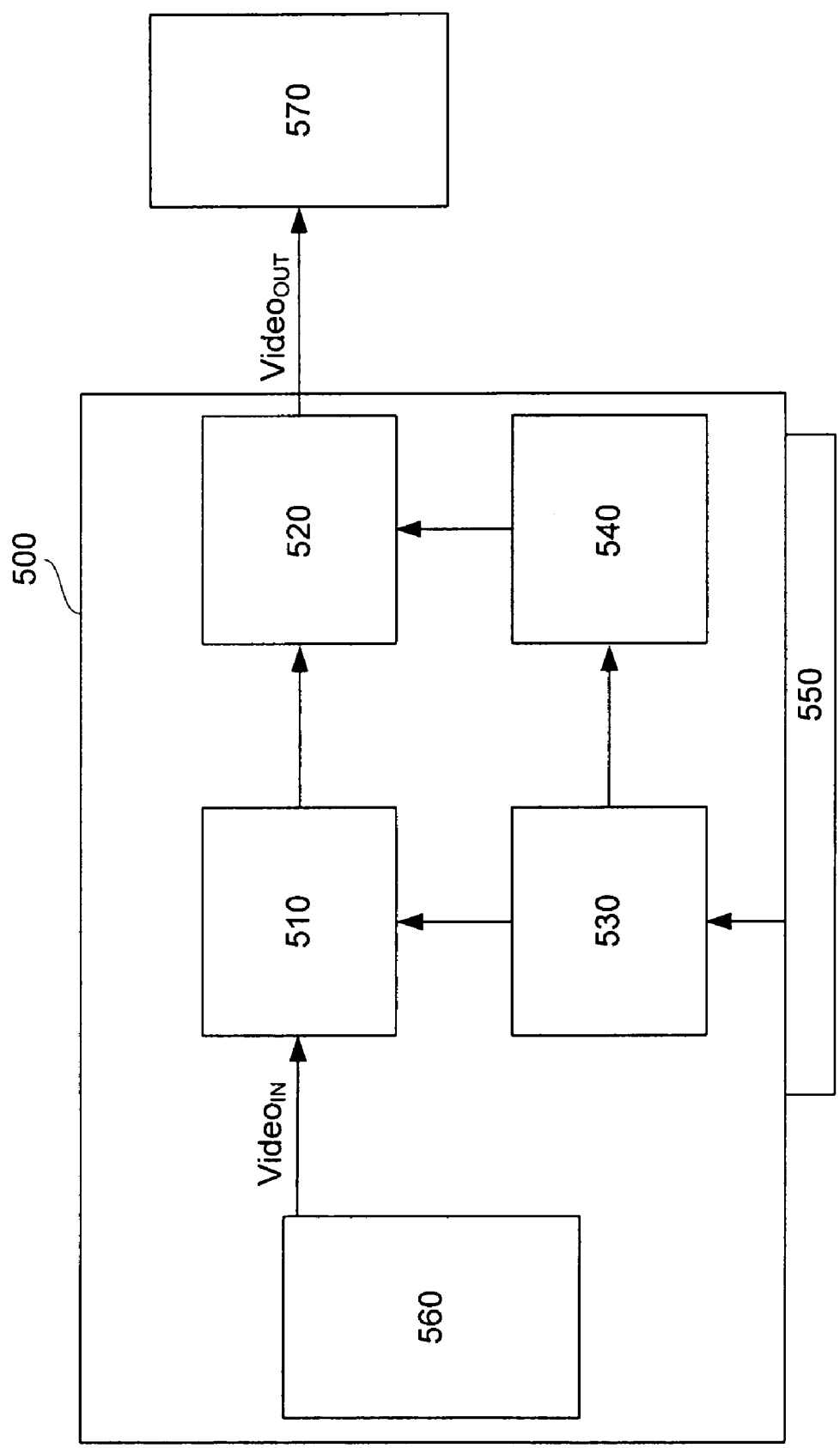
FIG. 5 is a block diagram of a video reproduction device.

FIG. 5 is a block diagram a video reproduction device 500. The video reproduction device 500 may be a DVD player. The video reproduction device 500 includes an image processor 510, a deinterlacing unit 520 and video data storage medium 560. The video reproduction device 500 further includes a processing controller 530 and a deinterlacing algorithm selector 540. The video data sent from Video$_{OUT}$ of the deinterlacing unit 520 may be read by a display device 570 for reproduction.

A front panel 550 may control the image processing, performed by the processor 510. The front panel 550 may include control buttons for initiating functions. Although not illustrated in FIG. 5, the front panel 550 may be replaced or supplemented by a remote control that provides corresponding or supplemental control functions.

Based on the front panel controls, the processor controller 530 may initiate the processing operation by sending respective commands to the processor 510. The processor 510 may start to read video data from the storage medium 560 for reproduction at a normal or increased reproduction speed.

The deinterlacing unit 520 may apply either a single deinterlacing algorithm, or select an appropriate deinterlacing algorithm depending on the supplemental information accompanying the video data. Motion vectors may represent the supplemental information underlying selection of the deinterlacing algorithm.

In the video reproduction device 500 of FIG. 5, selection of an appropriate deinterlacing algorithm may not be based on the image data, or information accompanying the image data. Rather, the deinterlacing algorithm selector 540 may be a unitary part of, or interfaced to the processing controller 530 to obtain the viewer's selected operating function. Based on the selected function, the appropriate deinterlacing algorithm may be selected that causes the deinterlacing unit 520 to process the video data according to the selected algorithm. Alternatively, the deinterlacing algorithm selector 540 may be separated from the processing controller 530. In this alternation, the deinterlacing algorithm selector 540 may be directly connected to the front panel 550.

Figure 6:
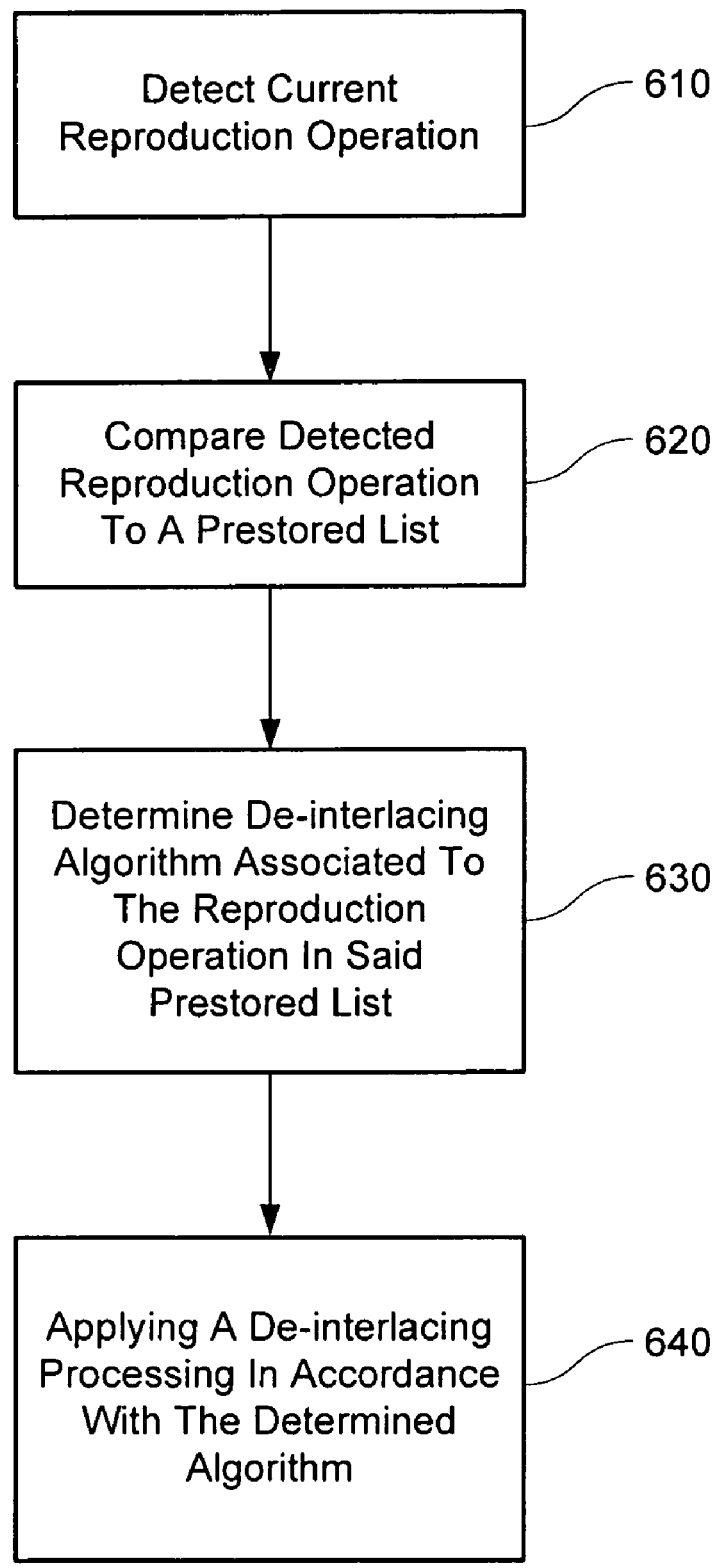
FIG. 6 is flow chart of a deinterlacing process.

FIG. 6 is a flow chart of a reproduction operation. The reproduction operation may be executed through the DVD player 400 shown in FIG. 4. The current reproduction operation may be detected at 610. The operation of the DVD player 400 may be monitored continuously and may provide a detection signal. At 620, the detected reproduction operation is compared to a pre-stored list of reproduction operations of the DVD player 400. The list may be pre-stored in a memory disposed within or interfaced to the DVD player 400 and may include possible reproduction operations. Each of the reproduction operations may be associated with a respective deinterlacing algorithm. A respective deinterlacing algorithm may be selected at 630 based on the detected current reproduction operation. At 640, a current video signal may be processed with the determined deinterlacing algorithm and may be sent on a display device.

The deinterlacing algorithms may include BOB and WEAVE deinterlacing techniques. By applying the BOB algorithm, the number of lines may be increased while the motion phase of a moving object may be preserved. Various other deinterlacing algorithms may also be included or used exclusively. A plurality of modified or other interlacing algorithms may be provided and selected. If BOB and/or WEAVE deinterlacing algorithms are used, they may be alternatively configured such that one of these two de-interlaced algorithms is selected as a default deinterlacing algorithm. In that case, it may need to pre-store and monitor functions that result in the application of the other deinterlacing algorithm than the BOB and WEAVE algorithms.

The user actuated reproduction functions preferably include at least one of the functions of PLAY, FAST FORWARD, REVERSE, STOP, PAUSE, MENU and/or navigation. These functions may also relate to the reproduction of different kinds of image content. Some of these functions may initiate reproduction of still images. In this association, those functions reliably relating to still image reproduction may be associated to a deinterlacing algorithm of high picture quality by combining subsequent fields.

The deinterlacing algorithm that preserves motion phases of a moving object such as a BOB deinterlacing technique may be selected through dual function buttons or multifunction switches that may include PLAY, FAST FORWARD and REVERSE functions. Further, WEAVE deinterlacing may be selected through another dual function buttons or multifunction switches including STOP, PAUSE, MENU and navigation buttons. These reproduction functions may provide still images for display on a display device. Accordingly, an appropriate deinterlacing algorithm may be selected without analyzing the currently reproduced image content.

Illustrated video reproduction devices may be coupled to, or integrated within a vehicle entertainment system. A device or structure for transporting persons or things may include on-board entertainment systems. Such entertainment systems may include a plurality of separate components linked by a communication bus or entertainment and comfort bus.

Figure 7:
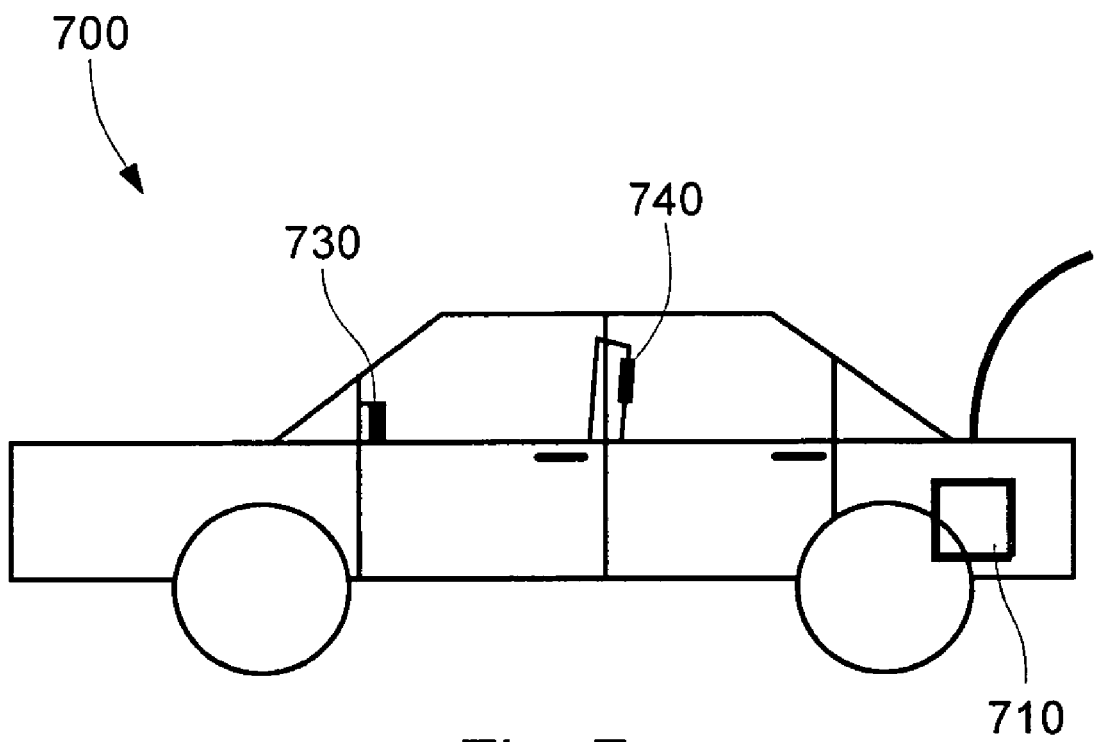
FIG. 7 is a block diagram of a vehicle entertainment system.

FIG. 7 illustrates a vehicle 700 with vehicle entertainments systems. Components of the vehicle entertainment systems may be centralized or distributed throughout the vehicle 700. Processing hardware 710 including a DVD player may be positioned near the rear side of the vehicle 700. Alternatively, the processing hardware 710 may be disposed in proximity to a central location such as a driver's seat. A display device 730 that displays video data may be mounted on a vehicle's dash board and another display device 740 may be disposed between front seats or rear seat.

FIG. 8 is a block diagram of a vehicle entertainment system 800. The vehicle entertainment system 800 may include a television receiver 810, a DVD player 820, and a display 840. Other components may be also integrated in the entertainment system 800. The components 810-840 of the vehicle entertainment system 800 may be interconnected or linked through a communication link 850. The DVD player 820 and/or the television receiver 810 may send video data across the communication link 850 to the display device 840. The communication link 850 may be a vehicle communication network that is linked to the plurality of entertainment components 810, 820, 830 and 840. The communication link may comply with the MOST (Mobile Open Systems Technologies) standard or other communication standards, or protocol.

The reproduction system of the interlaced video sequence is interfaced to a storage medium. Reproduction may be controlled through user actuated functions. The reproduction system may apply one, two or more deinterlacing algorithms. The deinterlacing algorithm may be selected in accordance with an actuated reproduction function. The reproduction system may include a controller interfaced to a deinterlacing unit that is linked to a selector. The controller may control a reproduction in respect to a user actuated reproduction function.

The deinterlacing algorithm may control the reproduction system. An improved picture quality may be achieved without complex hardware and/or software. The selection of an appropriate deinterlacing algorithm may occur without complicated image content analysis.

The reproduction of video from the storage medium improves increased picture quality. The interlaced video data is subject to a deinterlacing process. To avoid image content analysis that may be used for adaptive switch between different deinterlacing algorithms, the currently actuated operating function of the reproduction device may be monitored and deinterlacing algorithm may be selected based on monitored data. The reproduction of the interlaced video data improves picture quality in a simple and efficient manner.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for reproducing interlaced video data comprising:

providing a plurality of functions with a reproduction device comprising a memory, an image processor, a processor controller, and a deinterlacing unit;

storing in the memory a list of a plurality of reproduction functions associated with a plurality of deinterlacing algorithms;

in response to commands from the processor controller, reading with the image processor the interlaced video data from a storage medium;

activating one of a the plurality of reproduction functions relating to the interlaced video data;

selecting with the processor controller a deinterlacing algorithm associated with the activated reproduction function without analyzing image content of the interlaced video data;

applying with the deinterlacing unit the selected deinterlacing algorithm to the interlaced video data; and generating video data output in a deinterlaced form.

2. The method according to claim 1, where the act of selecting comprises selecting a weaving deinterlacing algorithm that combines consecutive fields of the interlaced video data.

3. The method according to claim 1, where the act of selecting comprises selecting a blending deinterlacing algorithm that doubles each line of a single field of the interlaced video data.

4. The method according to claim 1, where the act of activating comprises activating a dual function switch that comprises a PLAY function, a FAST FORWARD function, a REVERSE function, a STOP function, a PAUSE function, a MENU function or a navigation function.

5. The method according to claim 1, where the act of activating comprises activating one of the reproduction functions relating to video data in motion and the act of selecting comprises selecting the deinterlacing algorithm configured to preserve the motion.

6. The method according to claim 5, where the act of activating comprises activating one of a PLAY function, a FAST FORWARD function, and a REVERSE function and the act of selecting comprises selecting BOB deinterlacing algorithm in accordance with the activated reproduction function.

7. The method according to claim 1, where the act of activating comprises activating one of reproduction functions relating to a still video data and the act of selecting comprises selecting the deinterlacing algorithm configured to preserve vertical resolution of the still video data.

8. The method according to claim 7, where the act of activating comprises activating one of a STOP function, a PAUSE function, a MENU function and a navigation function and the act of selecting comprises selecting WEAVE deinterlacing algorithm in accordance with the activated reproduction function.

9. A reproduction system for interlaced video data, comprising:

a memory that stores a list of a plurality of reproduction functions associated with a plurality of deinterlacing algorithms;

a selector that is configured to detect a currently actuated reproduction function and select the deinterlacing algorithm associated with the detected reproduction function without analyzing image content of the interlaced video data; and a deinterlacing unit that is configured to apply the selected deinterlacing algorithm to the interlaced video data in response to data received from the selector.

10. The reproduction system of claim 9, further comprising a processor controller in communication with the selector and receiving an input of the currently activated reproduction function.

11. The reproduction system of claim 9, further comprising a control panel in communication with the selector and including a control button for initiating the production functions.

12. The reproduction system of claim 11, further comprising a remote control in communication with the selector arid providing a control function which correspond to or supplement the control button of the control panel.

13. The reproduction system of claim 9, further comprising a dual function button, operable to activate a selected reproduction function and a selected deinterlacing algorithm associated with the selected reproduction function.

14. The system according to claim 9, further comprising a storage medium that includes a flash memory.

15. The system according to claim 9, where the reproduction system comprises a hard disc video recorder.

16. The system according to claim 9, further comprising a multifunction switch coupled to the interlacing unit that is configured to select BOB deinterlacing algorithm for the reproduction function and one of a PLAY function, a FAST FORWARD function, and a REVERSE function.

17. The system according to claim 9, further comprising a multifunction switch coupled to the interlacing unit that is configured to select WEAVE deinterlacing algorithm for the reproduction function and one of a STOP function, a PAUSE function, a MENU function and a navigation function.

18. The system according to claim 9, where WEAVE deinterlacing algorithm is associated with the reproduction functions relating to a still image.

19. The system according to claim 9, where BOB deinterlacing algorithm is associated with the reproduction functions involving a moving object.

20. The system according to claim 9, where the selector associates the deinterlacing algorithm with the reproduction functions relating to an image content.

21. The system according to claim 20, where the selector is programmed to associate the deinterlacing algorithm configured to preserve video data in motion with the reproduction functions relating to the video data in motion.

22. The system according to claim 20, where the selector is programmed to associate the deinterlacing algorithm configured to preserve vertical resolution with the reproduction functions relating to still images.

23. A vehicle entertainment system, comprising:
   a reproduction system that reproduces interlaced video data from a storage medium and outputs a deinterlaced video data; and,
   a display that receives and displays the deinterlaced video data;
   the reproduction system, comprising:
      a memory that stores a list of a plurality of reproduction functions associated with a plurality of deinterlacing algorithms;
      a selector that is configured to detect a currently actuated reproduction function and select the deinterlacing algorithm associated with the detected function without analyzing image content of the interlaced video data; and
      a deinterlacing unit that is configured to apply the selected deinterlacing algorithm to an interlaced video data when instructed by the selector to send video data in a deinterlaced form.

* * * * *